United States Patent [19]

Watanabe

[11] Patent Number: 5,167,713
[45] Date of Patent: Dec. 1, 1992

[54] COATING APPARATUS

[75] Inventor: Masaru Watanabe, Nishinomiya, Japan

[73] Assignee: Matsushita Electric Industrial Co., Ltd., Osaka, Japan

[21] Appl. No.: 680,183

[22] Filed: Apr. 3, 1991

[30] Foreign Application Priority Data

May 18, 1990 [JP] Japan ................................. 2-129614

[51] Int. Cl.⁵ ............................................. B05C 5/02
[52] U.S. Cl. .................................. 118/411; 118/419; 427/356
[58] Field of Search ................ 118/411, 410, 419; 427/356, 131, 419.3

[56] References Cited

U.S. PATENT DOCUMENTS

| | | | |
|---|---|---|---|
| 4,424,762 | 1/1984 | Tanaka et al. | 118/410 |
| 4,480,583 | 11/1984 | Tanaka et al. | 118/410 |
| 4,537,801 | 8/1985 | Takeda | 427/356 |
| 4,854,262 | 8/1989 | Chino et al. | 118/411 |
| 4,994,306 | 2/1991 | Takahashi et al. | 427/131 |
| 5,028,450 | 7/1991 | Naka et al. | 118/410 |
| 5,069,934 | 12/1991 | Chino et al. | 427/131 |
| 5,083,524 | 1/1992 | Hiraki et al. | 118/419 |
| 5,097,792 | 3/1992 | Umemura et al. | 118/411 |

FOREIGN PATENT DOCUMENTS 3733031 4/1988 Fed. Rep. of Germany .
63-88080 4/1988 Japan .

OTHER PUBLICATIONS

"Coating Engineering" by Takashi Kageyama, vol. 21, No. 10, pp. 475–479, Apr. 1, 1986.

Primary Examiner—Michael G. Wityshyn
Attorney, Agent, or Firm—Lowe, Price, LeBlanc & Becker

[57] ABSTRACT

A coating apparatus for magnetic recording mediums used as magnetic tapes and floppy disks, capable of forming two layers by simultaneous coating on a support continuously traveling. The apparatus includes a die having a first, second and third lip and a first and second slit. The surfaces of the lips at a downstream side of the slits are curved to have arcs in their cross-sectional shapes at their tips, wherein; when the edge of the second lip on the side of the first slit is represented by A, the edge of the second lip on the side of the second slit is represented by B, the edge of the third lip on the side of the second slit is represented by C, and the edge of the third lip on the reverse side of the second slit is represented by D, the angle formed by a tangent line X and B and a tangent line Y and C is represented by $\theta$, $0 \leq \theta \leq 5°$; the length of an arc AB in the direction of support travel and the length of an arc CD in the direction of support travel are $3 \text{ mm} \leq AB \leq 7$ mm and $3 \text{ mm} \leq CD \leq 7$ mm; and when the curvature radius of the curved surface of the second lip is represented by R1 and the curvature radius of the curved surface of the third lip is represented by R2, $4 \text{ mm} \leq R1 \leq 20$ mm and $4 \text{ mm} \leq R2 \leq 20$ mm; and the second slit has a gap length of from 0.1 mm to 0.3 mm.

4 Claims, 2 Drawing Sheets

COATING APPARATUS

BACKGROUND OF THE INVENTION

1. Field of the Invention

This invention relates to a coating apparatus for magnetic recording mediums used as magnetic tapes or floppy disks. More particularly it relates to a coating apparatus that can provide two layers by simultaneous coating in a wet state and can give a smooth coating surface.

2. Description of the Prior Art

In recent years, as magnetic recording mediums are made to have higher performances, it has attracted notices to form magnetic layers in multiple layers. For example, a magnetic layer having good electromagnetic conversion characteristics in a high-density region is provided as an upper layer and a magnetic layer having better electromagnetic conversion characteristics in a low-density region than the upper layer is formed as a lower layer, so that it becomes possible to attain superior electromagnetic conversion characteristics that have not been achieved by single-layer mediums. In the case of, for example, video magnetic recording mediums of double-layer structure, the lower layer magnetic layer is so formed as to have a coating thickness larger than the upper layer magnetic layer, which is in the range of from 0.5 $\mu$m to 4 $\mu$m, and the upper layer is so formed as to have a coating thickness of from 0.2 $\mu$m to 0.8 $\mu$nm. A coating thickness larger than 0.8 $\mu$m, of the upper layer causes a lowering of the characteristics at a low-frequency band, and a thickness smaller than 0.1 $\mu$m, of the lower layer causes a lowering of characteristics at a high-frequency band because of a strong influence from the lower layer. It is desired for the magnetic recording mediums having such double-layer structure to be formed by coating and drying carried out once. A coating apparatus for providing two layers by simultaneous coating is disclosed, for example, in Japanese Laid-open Patent Application No. 63-88080.

Researches made by the present inventors, however, have revealed that lengthwise stripe pattern of uneven coating (stripe pattern coating faults) are produced when a magnetic coating solution for high-density recording is applied by the use of the above conventional coating apparatus. FIG. 4 shows a result obtained by measuring with a three-dimensional surface profile analyzer the surface of a coating which was formed using a conventionally known coating apparatus on a polyethylene terephthalate film of 14 $\mu$m thick, coated with a magnetic coating solution composed as shown later in Table 1 to form an upper layer in a dried coating thickness of 0.3 $\mu$m and also coated with a magnetic coating solution composed as shown later in Table 2 to form a lower layer in a dried coating thickness of 3 $\mu$m, followed by orientation, drying and then calendering. In order to make it easy to distinguish the projected portions of the coating surface, the result of measurement shows, in the three-dimensional display, only the part higher than a mean value in the height direction. As is recognized from the observation of the drawing, stripe pattern coating faults with a pitch of about 50 $\mu$m are seen on the coating surface in the direction of support travel. The mean surface roughness (hereinafter "RMS") of the coating surface was 15.8 nm. Electromagnetic conversion characteristics were also measured using an MII format deck to obtain the result that it was $-2$ dB on the basis of a standard tape of the applicant company and $-1$ dB in S/N ratio, in the video band output (7 MHz).

As is seen from the above results, the stripe pattern coating faults on the coating surface cause a serious lowering of electromagnetic conversion characteristics.

The present inventors investigated the causes of such stripe pattern coating faults to reveal that the following was responsible therefor.

In a magnetic coating solution, because of the influence of magnetic force acting between particles, it is difficult to presume that magnetic powder particles are present as primary particles. It can be presumed that they form a three-dimensional network structure and, when shear is applied thereto, they are broken into agglomerates having a certain size (Coating Engineering, Vol. 21, No. 10, pp. 475-479, 1986). In a magnetic coating solution in which a magnetic powder with a large magnetization and smaller average particle diameter is used, the particles are more strongly agglomerated. Hence, the above agglomerates are present on the order of several tens to hundreds $\mu$m in the coating solution which is flowing. When this magnetic coating solution is applied to a support by means of the conventional coating apparatus, the agglomerates are forced out onto a lip from a slit of the conventional coating apparatus and thereafter the lip surface can not be well smoothed. Thus the stripe pattern coating faults are produced.

The present inventors have also confirmed that such stripe pattern coating faults become more conspicuous when a support is coated with a magnetic coating solution in which a magnetic powder with larger magnetization and smaller average particle diameter is used. At present, magnetic recording mediums trend toward high-density recording and, for that purpose, a magnetic powder with high magnetic force and ultrafine particles is used. Hence, the above stripe pattern coating faults on the coating surface give a disadvantage that is fatal in view of product quality in the sense that they cause a serious lowering of electromagnetic conversion characteristics such as video band output and S/N ratio.

It has become clear that the relationship between a second lip and a third lip must be delicately controlled before uniform and stable coating can be carried out, particularly when two layers comprising an upper layer formed to have a very small coating thickness of from 0.2 $\mu$m to 0.8 $\mu$m are formed by simultaneous coating. The present invention was thus accomplished.

SUMMARY OF THE INVENTION

An object of the present invention is to provide a coating apparatus used for multi-layer simultaneous coating, capable of controlling the dried coating thickness of an upper layer to be in a submicron range, which is a coating apparatus for preparing a multi-layer coating that is homogeneous and superior in surface properties, more specifically, a magnetic coating medium of double-layer structure.

To achieve the above object, the present invention provides a coating apparatus comprising a die having three lips and two slits, the surfaces of the lips at the downstream side of said slits being curved to have arcs in their cross-sectional shapes at their tips, wherein;

when the edge of a second lip on the side of a first slit is represented by A, the edge of the second lip on the side of a second slit is represented by B, the edge of a third lip on the side of the second slit is represented by C, the edge of the third lip on the reverse side of the second slit is represented by D, and the angle formed by a tangent line X at B and a tangent line Y at C is represented by $\theta$, $$0 \leq \theta \leq 5°;$$

the length of an arc AB in the direction of support travel and the length of an arc CD in the direction of support travel are:

$$3 \text{ mm} \leq AB \leq 7 \text{ mm},$$

$$3 \text{ mm} \leq CD \leq 7 \text{ mm};$$

when the curvature radius of the curved surface of the second lip is represented by R1 and the curvature radius of the curved surface of the third lip is represented by R2, $$4 \text{ mm} \leq R1 \leq 20 \text{ mm},$$

$$4 \text{ mm} \leq R2 \leq 20 \text{ mm}; \text{ and}$$

the second slit has a gap length of from 0.1 mm to 0.3 mm.

According to the present invention constituted as described above, a lower layer magnetic coating solution extruded from the first slit is highly sheared at the gap between the surface AB of the second lip and a continuously traveling support, so that the agglomerates included in the lower layer magnetic coating solution are broken and the coating surface can be well smoothed.

An upper layer magnetic coating solution immediately thereafter extruded from the second slit is also highly sheared at the gap between the surface CD of the third lip and the support provided with the lower layer, so that the agglomerates included in the upper layer magnetic coating solution are broken and the coating surface can be well smoothed. In this way, the stripe pattern coating faults on the coating surface can be prevented.

Because of the second lip and third lip constituted as described above, the support on which the lower layer coating has been formed can be smoothly brought forward to the surface of the third lip without being greatly bent, so that the flow of the upper layer magnetic coating solution can not be disturbed and it becomes possible to carry out uniform and stable coating to thinly form the upper layer.

As described above, in the coating for preparing video tapes comprising a magnetic layer of double-layer structure, the present invention makes it possible to carry out uniform and stable coating to form the upper layer in a dried coating thickness of from 0.2 μm to 0.8 μm even with use of a magnetic coating solution tending to be very strongly agglomerated in which a magnetic powder with a strong magnetic force and with a small average particle diameter in the major-axis direction is used. It also makes it possible to carry out coating to give a very smooth coating surface. As a result, the product quality of high-density magnetic recording mediums of multi-layer structure can be greatly improved.

DESCRIPTION OF THE PREFERRED EMBODIMENTS

Embodiments of the present invention will be described below with reference to the accompanying drawings.

Figure 1:
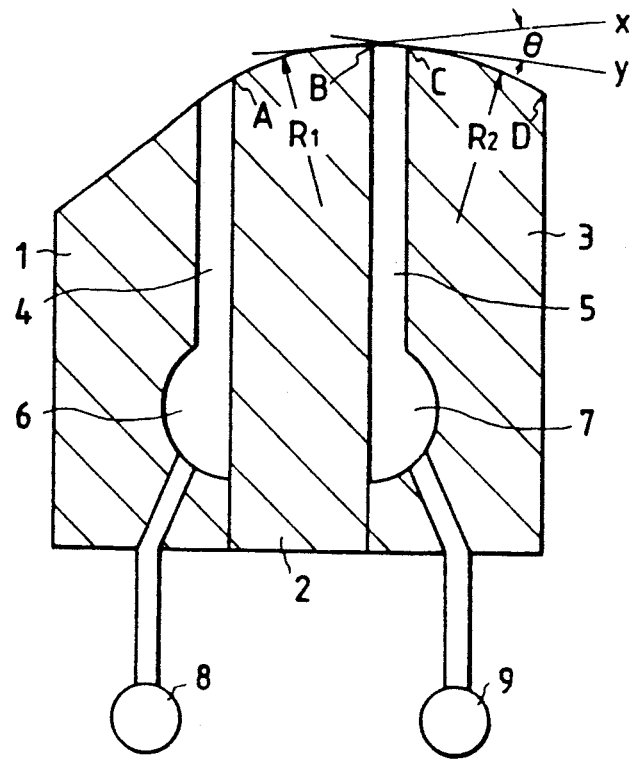
FIG. 1 is a schematic cross section of the coating apparatus of the present invention.

FIG. 1 schematically illustrates a cross section of the coating apparatus of the present invention. In FIG. 1, the numeral 1 denotes a first lip; 2, a second lip; 3, a third lip; 4, a first slit; 5, a second slit; 6, a first manifold; 7, a second manifold; 8, a first pump; and 9, a second pump. The surfaces of the second lip and the third lip are curved to have arcs in their cross-sectional shapes at their tips. The curved surface of the second lip has a curvature radius R1 of from 4 mm to 20 mm. The curved surface of the third lip has a curvature radius R2 of from 4 mm to 20 mm. As to the curvature radius of the curved surface of each lip, an optimum curvature radius may be selected depending on the conditions such as viscosity of magnetic coating solutions, coating rate and coating thickness. A curvature radius smaller than 4 mm, of the curved surface of the lip is undesirable since it results in an excessively large surface pressure applied from a support to a coating solution flowing through the gap between the top surfaces of lips and the support, to make it so difficult for the support to be lifted from the lips that no given coating thickness can be obtained or the thickness may become uneven in the direction of coating width. A curvature radius larger than 20 mm, of the curved surface of the lip is also undesirable since it results in an excessively small surface pressure applied from the support to the coating solution flowing through the gap between the top surfaces of lips and the support, to make it impossible to prevent air from accompanying the support and entering into the coating solution flowing through the above gap, thus causing voids to occur in coatings.

Stable and uniform coating can be carried out when the curvature radii of the curved surfaces of the second lip and third lip are within the range described above.

The second lip and third lip each have a thickness ranging from 2 mm to 10 mm.

As materials for the three lips, a cemented carbide should be used. The cemented carbide may include an alloy mainly composed of tungsten carbide (WC) and containing cobalt (Co), having a hardness of 70° or larger (in Rockwell hardness A scale). These lips can thereby be made up to have straightness and flatness on the order of several microns. It also becomes possible to prevent flash or rounding from occurring at the edges of the outlet ends of the second and third lips, which occurs when stainless steel or the like is worked. As a result, no thickness uneveness may occur in the width direction even when thin-layer coating is carried out, and it is possible to carry out good coating without causing longitudinal streaks due to the flash or rounding to occur on the coating surface.

The manifolds 6 and 7 extend through the coating apparatus in the direction of coating width. The cross sections of the manifolds may be either circular or semicircular.

The slit 4, i.e., the first slit, is set to have a gap length (i.e., a gap size in the direction of support travel) usually of from 0.1 mm to 0.5 mm, and the slit length in the width direction is substantially the same as the coating width.

The slit 5, i.e., the second slit, is set to have a gap length ranging from 0.1 mm to 0.3 mm. A gap length smaller than 0.1 mm is undesirable since it brings about a large hydrodynamic resistance of the coating solution flowing through the slit, to cause extrusion unevenness in the direction of slit width, resulting in occurrence of unevenness in coating thickness. On the other hand, a gap length larger than 0.3 mm brings about disturbance of the flow of the upper layer coating solution at the outlet of the second slit to make it impossible to carry out uniform coating for the upper layer.

The slit length that extends from the manifold to the slit outlet is set according to coating conditions such as the viscosity for which the thixotropic properties of coating solutions are taken into account and the amount of extrusion from the coating apparatus. The length may be usually from 20 mm to 100 mm.

The top of the first lip has a flat shape as shown in FIG. 1, but may have any of a curved surface and a polygonal surface.

Figure 2:
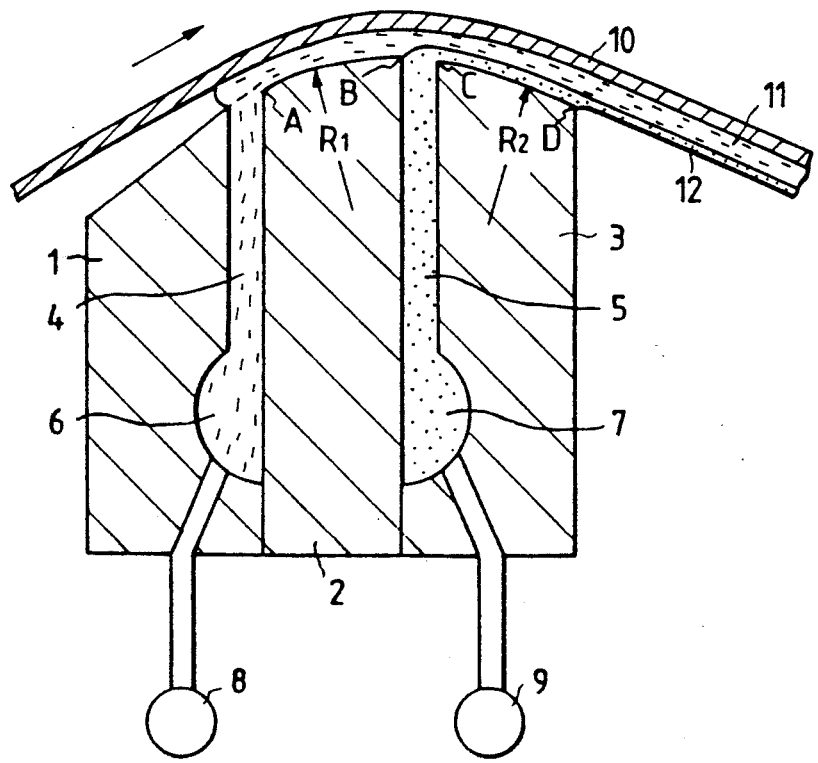
FIG. 2 shows how coating is carried out using the coating apparatus of the present invention.

FIG. 2 shows a state of magnetic coating solutions applied in double layers, using the coating apparatus of the present invention. In FIG. 2, the numerals 1 to 9 denote the same as those in FIG. 1. The numeral 10 denotes a support; 11, a lower layer coating solution; and 12, an upper layer coating solution.

The angle at which the support 10 is brought forward onto the present coating apparatus is adjusted by a guide roll (not shown) provided on the upstream side of the first lip, in such a way that it becomes substantially parallel to the tangent line at the edge A of the second lip on the side of the first slip. The angle at which the support 10 leaves from the present coating apparatus is adjusted by a guide roll (not shown) provided on the downstream side of the third lip, in such a way that it becomes substantially parallel to the tangent line at the edge D of the third lip on the reverse side of the second slit.

The lower layer magnetic coating solution 11 is continuously fed into the first manifold 6 by means of the first pump 8 in the quantity required for its coating on the support, and forced out to the first slit by the action of the pressure of liquid in the first manifold 6. The upper layer magnetic coating solution 12 is also continuously fed into the second manifold 7 by means of the second pump 9 in the quantity required for its coating on the support, and forced out to the second slit by the action of the pressure of liquid in the second manifold 7.

In the lower layer magnetic coating solution 11 extruded from the first slit 4, agglomerates of magnetic powder particles are present as previously stated. Since, however, the angle at which the support is brought forward onto the coating apparatus is set in the manner as described above, the gap between the surface AB of the second lip and the support 10 can be kept constant along the surface of the second lip in a distance about twice the wet coating thickness of the lower layer, and a high shear with a rate on the order of from $10^5$ to $10^6$ (1/sec) is continuously applied to the lower layer magnetic coating solution 11. Hence, the above agglomerates are finely broken to make the coating surface smooth and therefore do not cause the occurrence of stripe pattern coating faults on the coating surface.

The agglomerates of magnetic powder particles as stated above are also present in the upper layer magnetic coating solution 12 extruded from the second slit 5. Since, however, as previously described, the shapes of the second lip and third lip are set within the range of:

$$0 \leq \theta \leq 5°$$

wherein $\theta$ represents the angle formed by a tangent line X at the edge B of the second lip on the side of the second slit and a tangent line Y at the edge C of the third lip on the side of the second slit, the gap between the surface of the third lip and the support 10 can be kept constant along the surface CD of the third lip in a distance about twice the wet coating thicknesses of the upper layer and lower layer without any stagnation of liquid on the surface of the third lip, and a high shear with a rate on the order of from $10^5$ to $10^6$ (1/sec) is continuously applied to the upper layer magnetic coating solution 12. Hence, the agglomerates in the upper layer magnetic coating solution are finely broken to make the coating surface smooth.

Researches made by the present inventors have revealed that the arc length AB of the surface of the second lip and the arc length CD of the surface of the third lip very greatly influence the smoothness of a coating surface and coating stability in double-layer simultaneous coating.

More specifically, if the AB and CD are smaller than 3 mm, the distance or time in which a high shear is applied to the magnetic coating solution becomes shorter, and hence the agglomerates can not be well broken to cause the stripe pattern coating faults on the coating surface. On the other hand, if the AB and CD are made larger than 7 mm, it has been found that the hydrodynamic resistance of the magnetic coating solution flowing through the gap between the support and the second lip and third lip becomes so large that coating thickness becomes uneven in the direction of coating width to make it impossible to carry out stable coating. Hence, the AB and CD of the surfaces of the second lip and third lip must be in the range of 3 mm $\leq$ AB, CD $\leq$ 7 mm, within the range of which the stripe pattern coating faults can be prevented from occurring on the coating surface.

Researches made by the present inventors have also reveal that, when the angle formed by a tangent line X at the edge B of the second lip on the side of the second slit and a tangent line Y at the edge C of the third lip on the side of the second slit is represented by $\theta$, the shapes of the second lip and third lip must be set in the range of:

$$0 \leq \theta \leq 5°,$$

within the range of which the upper layer can be thinly formed by uniform and stable coating. The support having been provided thereon with the lower layer is separated from the second lip along the above tangent line X and is brought forward to the surface of the third lip along the above tangent line Y. If at this time the angle $\theta$ formed by the tangent lines X and Y is larger than 5°, it has been found that the support provided with the lower layer and brought forward onto the third slip is so greatly bent that the flow of the upper layer magnetic coating solution at the outlet of the second slit is disturbed to make it impossible to carry out uniform coating for the upper layer. So long as the $\theta$ is within the above range, the support may be only a little bent. Hence, the flow at the outlet of the second slit can not be disturbed and also the tension in the direction of support width can be kept uniform, so that it becomes possible to carry out uniform and stable coating to thinly form the upper layer.

The present invention will be described below in greater detail by giving Examples. The following Tables 1 and 2 are common to all Examples.

TABLE 1

| | |
|---|---|
| Magnetic iron powder: | 100 parts* |
| Major axis particle diameter: | 0.18 μm |
| Average axis ratio: | 1:12 |
| σs: | 128 emu/g |
| Hc: | 1,530 Oe |
| Conductive carbon: | 2 parts |
| Polyurethane resin: | 10 parts |
| Vinyl chloride-vinyl acetate copolymer: | 10 parts |
| Alumina ($\alpha$-$Al_2O_3$): | 5 parts |
| Stearic acid: | 2 parts |
| Butyl stearate: | 2 parts |
| Methyl ethyl ketone | 200 parts |
| Toluene: | 180 parts |
| Cyclohexanone | 40 parts |

*part(s) by weight

TABLE 2

| | |
|---|---|
| Magnetic ferric oxide: | 100 parts* |
| Major axis particle diameter: | 0.2 μm |
| Average axis ratio: | 1:10 |
| σs: | 75 emu/g |
| Hc: | 800 Oe |
| Conductive carbon: | 1 part |
| Polyurethane resin: | 10 parts |
| Vinyl chloride-vinyl acetate copolymer: | 10 parts |
| Alumina ($\alpha$-$Al_2O_3$): | 5 parts |
| Stearic acid: | 2 parts |
| Butyl stearate: | 1 parts |
| Methyl ethyl ketone | 200 parts |
| Toluene: | 200 parts |

*part(s) by weight

EXAMPLE 1

As a magnetic coating solution for the upper layer, the magnetic coating solution composed as shown in Table 1 was extruded from the second slit so as to give a dried coating thickness of 0.3 μm. As a magnetic coating solution for the lower layer, the magnetic coating solution composed as shown in Table 2 was extruded from the first slit so as to give a dried coating thickness of 3.0 μm. A polyethylene terephthalate film of 14 μm in thickness was thus coated with these coating solutions. The coating was carried out at a coating speed of 100 m/min under a support tension of 200 g/cm. In the coating apparatus, the curvature radius of the curved surface of the second lip was set to be 15 mm, the curvature radius of the curved surface of the third lip 5 mm, the length of the arc CD of the third lip 5 mm, which were kept unchanged, and the length of the arc AB of the second lip was varied as shown in Table 3. Coating was carried out using such coating apparatus.

TABLE 3

| AB: (mm) | 2 | 3 | 7 | 8 |
|---|---|---|---|---|

After the coating was completed, orientation and drying were carried out, followed by calendering. The resulting coated mediums were slit in a given width to give tapes.

Figure 4:
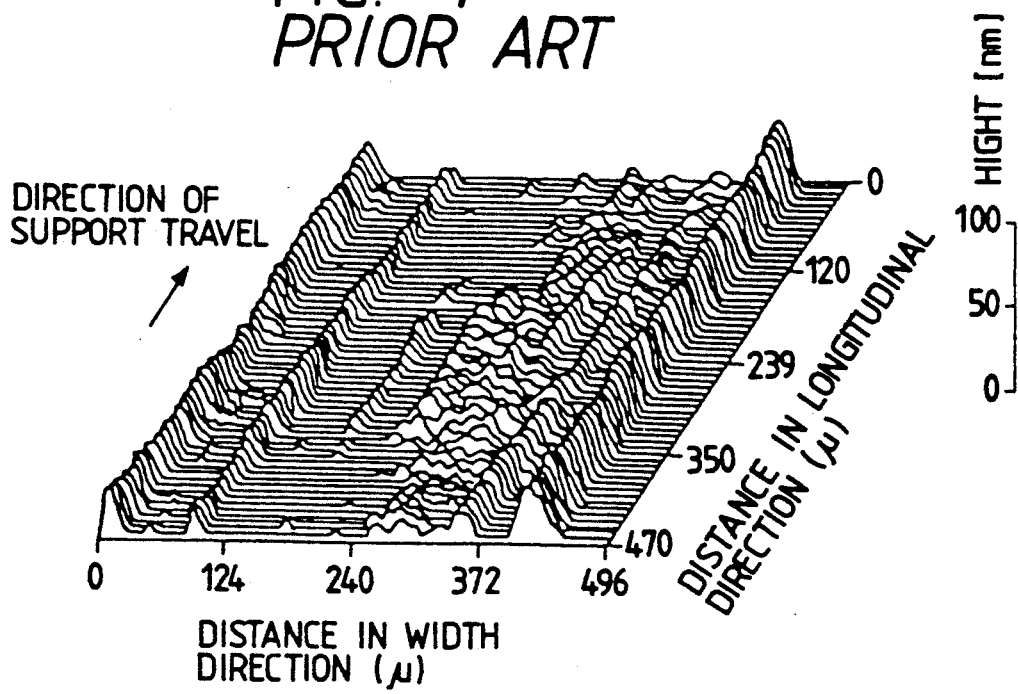

In the case of AB=8 mm, coating thickness became uneven in the direction of coating width, resulting in unsuccessful coating. The states of coating surfaces of the tapes prepared using the apparatus in which the AB was 2 mm, 3 mm or 7 mm were measured using a three-dimensional surface profile analyzer to reveal that the stripe pattern coating faults as shown in FIG. 4 occurred in the case of AB=2 mm. In the cases of AB=3 mm and AB=7 mm, no longitudinal streaks occurred.

Figure 3:
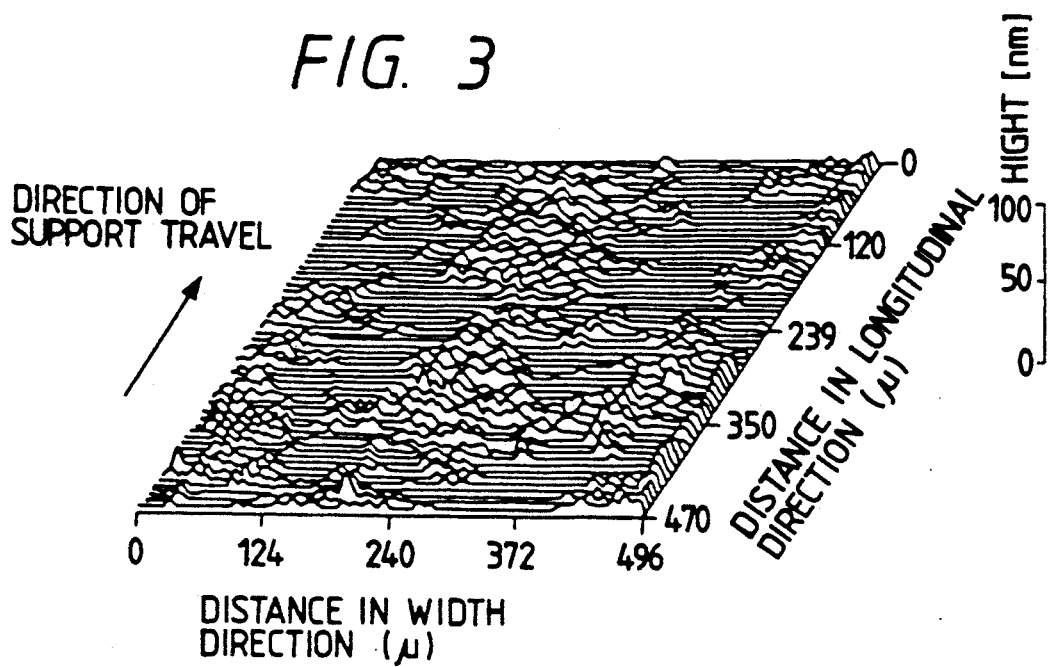
FIGS. 3 and 4 each show a result obtained by measuring a coating surface with a three-dimensional surface profile analyzer.

The state of the coating surface in the case of, for example, AB=3 mm is shown in FIG. 3. The stripe pattern coating faults (FIG. 4) did not occur at all, and a very smooth coating surface was obtained when the coating apparatus of the present invention was used.

The tapes prepared using the respective coating apparatus used in the present example and a tape prepared using the prior art coating apparatus disclosed in Japanese Laid-open Patent Application No. 63-88080 were measured to examine their electromagnetic conversion characteristics, i.e., outputs and S/N ratios at a frequency of 7 MHz corresponding to a video band, using an MII format deck. Results obtained are shown in Table 4. In the measurement of the electromagnetic conversion characteristics, an MII tape prepared by the applicant company was used as a standard tape so that the comparison can be understood with ease. In Table 4, the results on the RMS measured with the three-dimensional surface profile analyzer are also shown together.

The tapes prepared using the coating apparatus of the present invention, i.e., the apparatus of AB=3 mm or 7 mm, had so much smooth coating surfaces that the RMS was smaller and the reproduction output and S/N ratio were both on much higher levels than those of the tapes prepared by the coating using the coating apparatus of AB=2 mm and the prior art coating apparatus. Thus, the effect of the present invention was confirmed to be remarkable.

TABLE 4

| | Electromagnetic conversion characteristics | | |
|---|---|---|---|
| Tapes in Example 1 | S/N ratio | Video band output (7 MHz) | RMS |
| AB = 2 mm | −1.0 dB | −1.5 dB | 13.7 nm |
| AB = 3 mm | +0.5 dB | +1.0 dB | 4.6 nm |
| AB = 7 mm | +0.5 dB | +1.0 dB | 5.0 nm |
| AB = 8 mm | Unevenness occurred in coating thickness to make it impossible to carry out coating. | | |
| Tape according to the prior art: | −1.0 dB | −2.0 dB | 15.8 nm |
| Standard tape*: | 0 dB | 0 dB | 7.0 nm |

*In the measurement, for comparison, an MII format tape produced by Matsushita Electric Industrial Co., Ltd. was used as the standard tape.

EXAMPLE 2

As a magnetic coating solution for the upper layer, the magnetic coating solution composed as shown in Table 1 was extruded from the second slit so as to give a dried coating thickness of 0.3 μm. As a magnetic coating solution for the lower layer, the magnetic coating solution composed as shown in Table 2 was extruded from the first slit so as to give a dried coating thickness of 3.0 μm. A polyethylene terephthalate film of 14 μm in thickness was thus coated with these coating solutions. The coating was carried out at a coating speed of 100 m/min under a support tension of 200 g/cm. In the coating apparatus, the curvature radius of the curved surface of the second lip was set to be 15 mm, the curvature radius of the curved surface of the third lip 5 mm, the length of the arc AB of the second lip 5 mm, which were kept unchanged, and the length of the arc CD of the third lip was varied as shown in Table 5. Coating was carried out using such coating apparatus.

TABLE 5

| CD: (mm) | 2 | 3 | 7 | 8 |
| --- | --- | --- | --- | --- |

After the coating was completed, orientation and drying were carried out, followed by calendering. The resulting coated mediums were slit in a given width to give tapes.

In the case of CD=8 mm, coating thickness became uneven in the direction of coating width, resulting in unsuccessful coating. The states of coating surfaces of the tapes prepared using the apparatus in which the CD was 2 mm, 3 mm or 7 mm were measured using a three-dimensional surface profile analyzer to reveal that the stripe pattern coating faults as shown in FIG. 4 occurred in the case of CD=2 mm. In the cases of CD=3 mm and CD=7 mm, very smooth coating surfaces were obtained as in FIG. 3 shown in relation to Example 1.

In the same manner as in Example 1, the tapes prepared using the respective coating apparatus used in the present example and a tape prepared using the prior art coating apparatus were measured to examine their electromagnetic conversion characteristics, i.e., outputs and S/N ratios at a frequency of 7 MHz corresponding to a video band, using an MII format deck. Results obtained are shown in Table 6 together with the results of RMS measurement.

The tapes prepared using the coating apparatus of the present invention, i.e., the apparatus of CD=3 mm or 7 mm, had such smooth coating surfaces that the RMS was smaller and the reproduction output and S/N ratio were both on much higher levels than those of the tape prepared by the coating using the prior art coating apparatus. Thus, the effect of the present invention was confirmed to be remarkable also in the present Example.

TABLE 6

| Tapes in Example 2 | Electromagnetic conversion characteristics | | RMS |
| --- | --- | --- | --- |
| | S/N ratio | Video band output (7 MHz) | |
| CD = 2 mm | −1.0 dB | −1.5 dB | 14.2 nm |
| CD = 3 mm | +0.5 dB | +1.0 dB | 4.8 nm |
| CD = 7 mm | +0.5 dB | +1.0 dB | 4.9 nm |
| CD = 8 mm | Unevenness occurred in coating thickness to make it impossible to carry out coating. | | |
| Tape according to the prior art: | −1.0 dB | −2.0 dB | 15.8 nm |
| Standard tape*: | 0 dB | 0 dB | 7.0 nm |

*In the measurement, for comparison, an MII format tape produced by Matsushita Electric Industrial Co., Ltd. was used as the standard tape.

EXAMPLE 3

As a magnetic coating solution for the upper layer, the magnetic coating solution composed as shown in Table 1 was extruded from the second slit so as to give a dried coating thickness of 0.1 μm. As a magnetic coating solution for the lower layer, the magnetic coating solution composed as shown in Table 2 was extruded from the first slit so as to give a dried coating thickness of 3.0 μm. A polyethylene terephthalate film of 14 μm in thickness was thus coated with these coating solutions. The coating was carried out at a coating speed of 100 m/min. In the coating apparatus, the lengths of AB and CD were each set to be 5 mm, the curvature radius of the curved surface of the second lip 10 mm, the curvature radius of the curved surface of the third lip 10 mm, which were kept unchanged, and the angle $\theta$ formed by a tangent line X at the edge B of the second lip on the side of the second slit and a tangent line Y at the edge C of the third lip on the side of the second slit was varied as shown in Table 7. Coating was carried out using such coating apparatus.

TABLE 7

| $\theta$: (°) | 0 | 5 | 6 |
| --- | --- | --- | --- |

After the coating was completed, orientation and drying were carried out, followed by calendering. The resulting coated mediums were slit in a given width to give tapes.

In the case when $\theta$ is 6°, coating thickness became uneven in the direction of coating width to make it impossible to carry out uniform coating. In the case when $\theta$ is 0° and 5° each, it was possible to carry out uniform and stable coating to form the upper layer. Thus the effect of the present invention was confirmed to be remarkable also in the present Example.

EXAMPLE 4

As a magnetic coating solution for the upper layer, the magnetic coating solution composed as shown in Table 1 was extruded from the second slit so as to give a dried coating thickness of 0.5 μm. As a magnetic coating solution for the lower layer, the magnetic coating solution composed as shown in Table 2 was extruded from the first slit so as to give a dried coating thickness of 3.0 μm. A polyethylene terephthalate film of 14 μm in thickness was thus coated with these coating solutions. The coating was carried out at a coating speed of 100 m/min. In the coating apparatus, the lengths of AB and CD were each set to be 5 mm, the curvature radius of the curved surface of the second lip 10 mm, the curvature radius of the curved surface of the third lip 10 mm, which were kept unchanged, and the angle $\theta$ formed by a tangent line X at the edge B of the second lip on the side of the second slit and a tangent line Y at the edge C of the third lip on the side of the second slit was varied as shown in Table 8. Coating was carried out using such coating apparatus.

TABLE 8

| $\theta$: (°) | 0 | 5 | 6 |
| --- | --- | --- | --- |

After the coating was completed, orientation and drying were carried out, followed by calendering. The resulting coated mediums were slit in a given width to give tapes.

In the case when $\theta$ is 6°, coating thickness became uneven in the direction of coating width to make it impossible to carry out uniform coating. In the case when $\theta$ is 0° and 5° each, it was possible to carry out uniform and stable coating to form the upper layer. Thus the effect of the present invention was confirmed to be remarkable also in the present Example.

COMPARATIVE EXAMPLE

As a magnetic coating solution for the upper layer, the magnetic coating solution composed as shown in Table 1 was extruded from the second slit so as to give a dried coating thickness of 0.3 μm. As a magnetic coating solution for the lower layer, the magnetic coating solution composed as shown in Table 2 was extruded from the first slit so as to give a dried coating thickness of 3.0 μm. A polyethylene terephthalate film of 14 μm in thickness was thus coated with these coating solutions, using the prior art coating apparatus. The coating was carried out at a coating speed of 100 m/min under a support tension of 200 g/cm. After the coating was completed, orientation and drying were carried out, followed by calendering. The resulting coated mediums were slit in a given width to give a tape.

The coating surface of the resulting tape was measured with a three-dimensional surface profile analyzer to obtain the result as shown in FIG. 3. Its electromagnetic conversion characteristics such as output and S/N ratio at a frequency of 7 MHz are shown in Table 4.

What is claimed is:

1. A coating apparatus comprising a die having three lips and two slits, the surfaces of the lips at a downstream side of said slits being curved to have arcs in their cross-sectional shapes at their tips, wherein;

when an edge of a second lip on a side of a first slit is represented by A, an edge of the second lip on a side of a second slit is represented by B, an edge of a third lip on a side of the second slit is represented by C, an edge of the third lip on a side opposite the second slit is represented by D, and an angle formed by a tangent line X at B extending toward the direction of D and a tangent line Y at C extending toward the direction of D is represented by $\theta$, $0 \leq \theta \leq 5°$;

the arc CD extending between edges C and D at the third lip is formed so that the edge C is the closest point on the arc CD to the tangent line X, the length of an arc AB extending between edges A and B and the length of an arc CD are:

$3 \text{ mm} \leq AB \leq 7 \text{ mm}$, $3 \text{ mm} \leq CD \leq 7 \text{ mm}$;

when the curvature radius of the curved surface of the second lip is represented by R1 and the curvature radius of the curved surface of the third lip is represented by R2, $4 \text{ mm} \leq R1 \leq 20 \text{ mm}$, $4 \text{ mm} \leq R2 \leq 20 \text{ mm}$; and the second slit has a gap length of from 0.1 mm to 0.3 mm.

2. A coating apparatus according to claim 1, wherein said first, second and third lips are made of a cemented carbide.

3. A coating apparatus according to claim 1, wherein the first slit has a gap length of from 0.1 mm to 0.5 mm.

4. A coating apparatus according to claim 1, wherein the slit length that extends from the manifold to the slit outlet ranges from 20 mm to 100 mm for each of the first and second slits.

* * * * *